(12) United States Patent
Gidney (10) Patent No.: US 11,416,767 B2
(45) Date of Patent: Aug. 16, 2022

(54) GENERATIVE ADVERSARIAL NETWORK MODEL TRAINING USING DISTRIBUTED LEDGER

(71) Applicant: Seal Software Ltd., Godalming (GB)

(72) Inventor: Kevin Gidney, Oslow (NO)

(73) Assignee: DOCUSIGN INTERNATIONAL (EMEA) LIMITED, Dublin (IE)

(*) Notice: Subject to any disclaimer, the term of this patent is extended or adjusted under 35 U.S.C. 154(b) by 875 days.

(21) Appl. No.: 16/244,082

(22) Filed: Jan. 9, 2019

(65) Prior Publication Data

US 2019/0332966 A1 Oct. 31, 2019

Related U.S. Application Data

(60) Provisional application No. 62/663,638, filed on Apr. 27, 2018.

(51) Int. Cl.
*G06N 20/00* (2019.01)
*G06Q 20/08* (2012.01)
*G06F 16/182* (2019.01)

(52) U.S. Cl.
CPC .......... *G06N 20/00* (2019.01); *G06F 16/182* (2019.01); *G06Q 20/0855* (2013.01)

(58) Field of Classification Search
CPC ...... G06N 20/00; G06N 3/006; G06N 3/0454; G06N 3/0472; G06N 3/088; G06N 5/02; G06N 20/20; G06F 16/182; G06F 16/906; G06Q 20/0855; G06Q 2220/00; G06Q 20/065

USPC .......................................................... 706/12
See application file for complete search history.

(56) References Cited

FOREIGN PATENT DOCUMENTS

JP 2004295674 A * 10/2004 ........ G06F 17/30911

OTHER PUBLICATIONS

Shaan Ray, The Diference Between Blockchains & Disributed Ledger Technology, 2018 (Year: 2018).*

* cited by examiner

*Primary Examiner* — Tarek Elchanti
(74) *Attorney, Agent, or Firm* — Fenwick & West LLP (57) ABSTRACT

Embodiments are directed to the tracking of data in a generative adversarial network (GAN) model using a distributed ledger system, such as a blockchain. A learning platform implementing a classification model receives, from a third party, a set of data examples generated by a generator model. The set of data examples are processed by the classification model, which outputs a prediction for each data example indicating whether each data example is true or false. The distributed ledger keeps a record of data examples submitted to the learning platform, as well as of predictions determined by the classification model on the learning platform. The learning platform analyzes the records of the distributed ledger, and pairs the records corresponding to the submitted data examples and the generated predictions determined by the classification model, and determines if the predictions were correct. The classification model may then be updated based upon the prediction results.

17 Claims, 5 Drawing Sheets

GENERATIVE ADVERSARIAL NETWORK MODEL TRAINING USING DISTRIBUTED LEDGER

CROSS-REFERENCE TO RELATED APPLICATIONS

This application claims priority to U.S. Provisional Patent Application No. 62/663,638, filed Apr. 27, 2018, which is hereby incorporated by reference in its entirety.

TECHNICAL FIELD

The disclosure generally relates to the field of information storage and management, and in particular, to the use of distributed ledgers to monitor and track data submitted by different parties for model training.

BACKGROUND

A contract is a document that defines legally enforceable agreements between two or more parties. During the negotiation process, parties to the contract often agree to make multiple amendments or addendums, and these amendments or addendums can be stored in random formats in different locations.

Frequent changes in contracts often present challenges to conventional approaches for finding contracts and amendments, as conventional approaches typically focus on the unstructured text only and are not able to extract relevant and important information correctly. For example, a contract and amendments may include the clauses that contain wording such as "net 30 days," "within 30 days," "30 day's notice," and "2% penalty." On the other hand, one of the amendments may include the non-standard clauses such as "5 working days" with "60% penalty."

Without the ability to discover the clauses and types of the clauses accounting for their semantic variations, any party not keeping track of the amendments or the addendums is vulnerable to a significant amount of risk of overlooking unusual contractual terminologies.

Models may be used to automatically analyze a contract document in order to identify particular types of clauses. Models may be generated using machine learning, based on a training set of clause examples. In order for the model to learn effectively, it should have access to as much disparate data as possible. However, different parties with access to disparate sets of data may be hesitant to allow their data to be used for training models that may be used by other parties.

SUMMARY

Embodiments are directed to the tracking of data in a generative adversarial network (GAN) model using a distributed ledger system, for example, a blockchain. A learning platform implementing a classification model receives, from a third party, a set of data examples generated by a generator model. The set of generated data examples are processed by the classification model, which outputs a prediction for each data example indicating whether each data example is true or false. The distributed ledger keeps a record of data examples submitted to the learning platform, as well as of predictions determined by the classification model on the learning platform. The learning platform analyzes the records of the distributed ledger, and pairs the records corresponding to the submitted data examples and the generated predictions determined by the classification model, and determines if the predictions were correct. The classification model may then be updated based upon the prediction results.

The user of the distributed ledger allows for each of the third parties to track how their data that is submitted to the learning platform is used. For example, the records of the distributed ledger may correspond to the data being submitted to the learning platform, the data being processed by the classification model, the results of the classification, and/or the like. In addition, in some embodiments, the learning platform may pay out an amount of currency or other incentives to a third party for submitting examples that the classification model classifies incorrectly. By recording classification results and payments made by the learning platform on the distributed ledger, operation of the learning platform may be made transparent and easily verifiable by the third parties.

Some embodiments are directed to a method for operating a GAN model. The method comprises receiving, from a third party system of a plurality of third party systems, a set of data examples generated by a generator model in response to receiving one or more true data examples, wherein each of the generated set of data examples corresponds to either a true example or a false example. The data examples are stored on a file system, and a first set of records is recorded on a distributed ledger. The first set of records may comprise at least a pointer to the set of data example stored on the file system, and, for each of the data examples, an indication of whether the data example is a true example or a false example. The method may further comprise evaluating the received set of data examples using a machine-trained model configured to, for each data example, generate a prediction of whether the data example is a true example or a false example, and recording, on the distributed ledger, a second set of records which indicate a pointer to the set of data examples stored on the file system, and, for each of the data examples, an indication of the prediction generated by the machine-trained model corresponding to the data example. By comparing the indications of the first set of records and the second set of records, whether the predictions generated by the machine-trained model were correct can be determined. The model may then be updated or retrained based upon the results of the comparison.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Machine learning models may be used to automate a variety of functions, such as performing automatic clause detection in documents. For example, a model may be trained on training data comprising a set of clause examples, such that the model is able to, when presented with a document, identifying particular types of clauses present in the document. This may allow for the provisions of a contract document to be easily identified and tracked, even as additional amendments and addendums are added in the contract.

Data usable for model training may be owned by a plurality of parties (also referred to as "third parties"). Each party may correspond to a customer or client of a learning platform for generating and training models, and may have access to a different set of data usable for training a model. For example, each party may have access to a plurality of contracts containing identified clause examples that can be used by the learning platform for generating and training the model.

However, if each party is only able to train a model on information that they have access to and can effectively track and, if required, revoke access to or destroy, the generated model may be over-fitted to a small subset of information, limiting the benefits of the automation of information detection. This presents a difficult problem for the training of models for the detection of the widest possible information within the same category.

In order to effectively train a model, the learning platform should have access to as much disparate data as possible. This may be accomplished by using information from many different parties to train the model. For example, different parties may have access to information (e.g., clauses) from different verticals and industries that detail the same concept or category, for example indemnity or assignment language, that collectively may form a large set of disparate data that can be used by the system for training the model for classifying the concept or category. By training the model on a more distributed set of data (e.g., different sets of data received from different parties), a more comprehensive model can be generated in comparison to models only trained on data from a single party. In some embodiments, the model may be referred to as a "distributed model" due to being trained using a distributed set of data.

In some embodiments, a system and method is provided allowing parties to provide information into a SWARM learning method, in order to allow for different parties to submit data to a distributed file system for model training and to remove their data from the file system and model. A SWARM learning method is defined as allowing each party the ability to provide a small part of the information, yet within a secure, traceable, trustable and distributed system.

In some embodiments, each party maintains a model that, using machine-learning, auto-learns and generates its own new information based upon existing information owned by the party. The generated information is submitted to the trained model on the learning platform to be evaluated and classified. In some embodiments, the generated information comprises one or more generated data examples, where each of the generated data examples may be designated a "true" example (e.g., an example that, if evaluated correctly by the model, would be classified as being of a particular type) or a "false" example (e.g., an example that, if evaluated correctly by the model, would be classified as not being of the particular type). In some embodiments, certain data example may not be entirely of or of not a particular type. As such, one or more of generated data examples may correspond to "gradient" examples associated with a score indicating a level to which data example is of the particular type. The classification results determined by the model are compared with the actual designations of the generated data examples, to determine incorrect classifications by the model, which can be used to re-evaluate or retrain the model, potentially improving the accuracy of the model. In some embodiments, this arrangement may be referred to as a GAN (Generative Adversarial Network), in which each party generates data examples in an attempt to "fool" the trained model into making an incorrect classification, allowing for the model to be further trained and refined. In some embodiments, incorrect classifications of a data example by the model may result in incentives (e.g., rewards such as digital currency) to be provided to the submitting party.

In some embodiments, the GAN may be run as a many-to-one configuration, in which multiple parties submit generated data examples to be evaluated by the model, and compete to earn the most rewards. In other embodiments, the learning platform may maintain multiple models, each configured to receive data examples generated by a different third party generator model. After a period of time (e.g., a cycle time of the blockchain), a mapping between the learning platform models and the third party generator models may be changed, such that each model on the learning platform will receive generated data examples from a different third party generator model, allowing for each model to be trained on a more distributed data set and avoiding the overfitting of the models of the data of a single party. The mappings between the models on the learning platform and the third party generator models may be recorded for review and audit reasons on the distributed ledger. The models may be evaluated based upon how accurately they are able to classify the data examples received from the different generator models over different periods of time, and a final model may be selected based upon the evaluated results.

The use of GAN (Generative Adversarial Network) learning, combined with a secure distributed ledger, e.g., blockchain, and optionally a corresponding reward (e.g., credit and/or payment method), would enable parties to not only benefit from a model trained using a SWARM intelligence and learning system, but to also gain rewards from generating examples used for training the model. As information is now seen as a tangible asset, this may allow for parties to be able to gain financially from the data and knowledge they have.

Clause Detection System Overview

Figure 1:
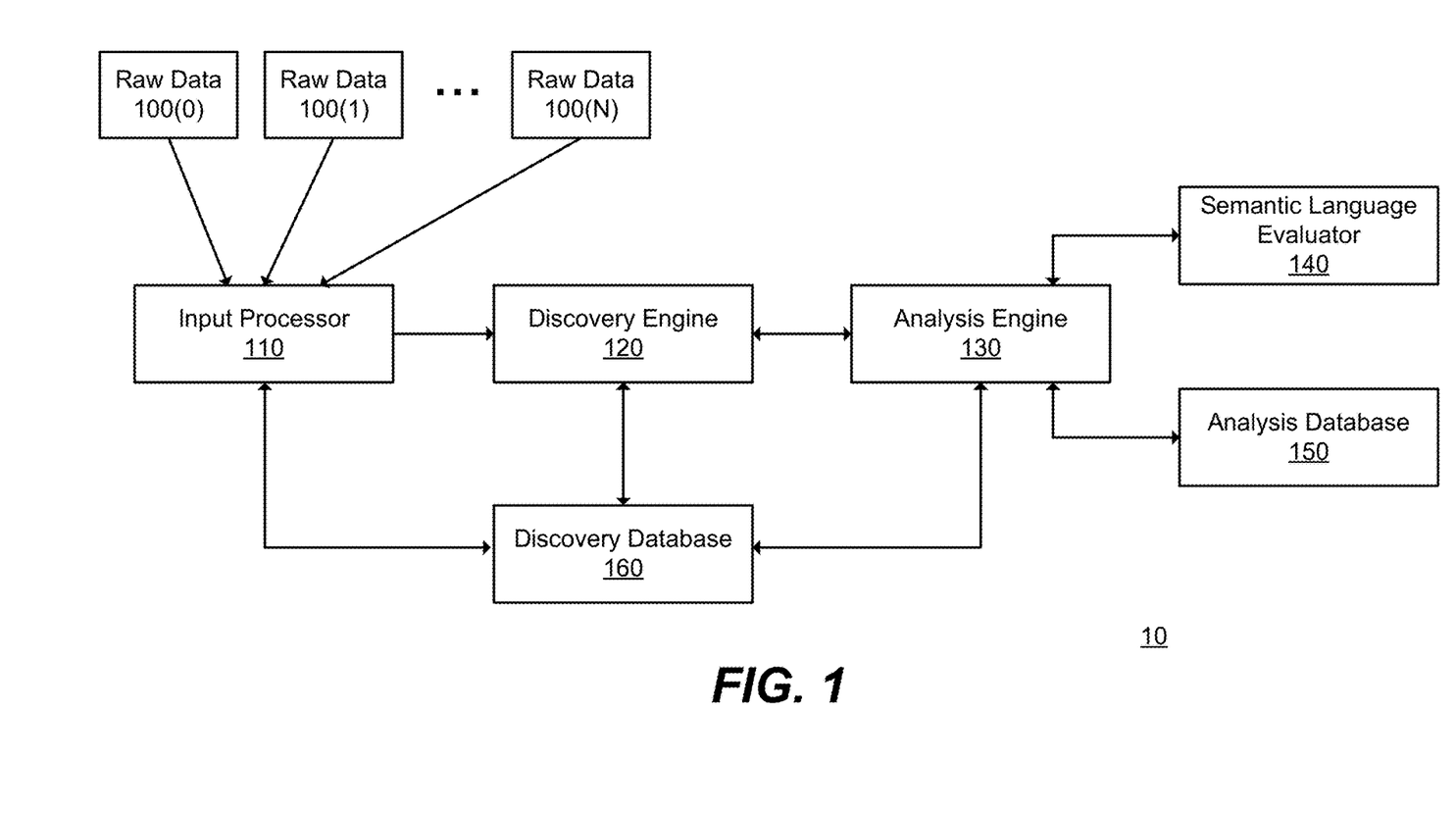
FIG. 1 illustrates one embodiment of a clause detection system for a contractual document.

Figure (FIG. 1 illustrates one exemplary embodiment of a clause detection system 10 including one or more input processors (generally an input processor 110), a discovery engine 120, an analysis engine 130, a semantic language evaluator 140, and an analysis database 150. Each of these components may be embodied as hardware, software, firmware or a combination thereof. In various embodiments, engines or modules include software (or firmware) structured to operate with processing components of a computing system to form a machine that operates as described herein for the corresponding engines or modules. Further, two or more engines may interoperate to form a machine that operates as described herein. Examples of the processing components of the computing system are described with respect to FIG. 5. The system 10 also comprises a discovery database 160 to store data for identifying standard exact clauses and non-standard clauses.

As illustrated in FIG. 1, the input processor 110 aggregates one or more raw data 100(0), 100(1) . . . 100(N) (generally 100) and processes them in an appropriate format. Also, the discovery engine 120 is communicatively coupled to the input processor 110. In addition, the analysis engine 130 is coupled to the discovery engine 120. The discovery engine 120 develops a predefined policy and initial search results. Additionally, the analysis engine 130 performs a semantic language analysis by applying policies to the semantic language evaluator 140, and determines the non-standard clauses, standard clauses, and standard exact clauses used in the raw data 100. Throughout the process the discovery database 160 stores the initial search results, metadata, and the predefined policy. In addition, the discovery database 160 is communicatively coupled to the input processor 110, the discovery engine 120, and the analysis engine 130. Additionally, the analysis engine 130 is coupled to the analysis database 150 and stores information for performing semantic language evaluation. In one embodiment, the discovery database 160 and the analysis database 150 can be combined into one database.

In some embodiments, the analysis engine 130 and/or semantic language evaluator 140 may implement a machine learning model for analyzing the received input data. For example, the machine learning model may be trained based upon sets of training data submitted by different parties, and used to semantically analyze and classify the received input data. In some embodiments, the model may analyze the received input data to determine the presence of certain types of clauses within the received input data. In some embodiments, the analysis engine 130 or the semantic language evaluator 140 may access the model generated and trained by a learning platform. In some embodiments, the learning platform is implemented as part of the analysis engine 130 or the semantic language evaluator 140.

Model Training Using a Distributed Ledger, e.g., Blockchain

In order for a machine learning model to be usable for analyzing received input data, the model must first be generated and trained by a learning platform. As discussed above, the data used for training the model may be received from a plurality of different parties (e.g., third parties). However, each third party may desire to be able track how its own data is used by the learning platform in a secure and transparent manner. In order to ensure that the data received from each party is marked and tracked, the submission of data from various parties may be managed by a distributed ledger, such as a blockchain.

A method of tracking use of data by the learning platform is to use a distributed ledger technology (e.g., a blockchain) to provide an infrastructure for the sharing of data (e.g., contractual clauses), where each customer presents onto the chain the clauses they are willing to share for learning purposes. Through the user of the distributed ledger, an immutable record of operations performed by the learning platform (e.g., adding data, removing data, training a model, etc.) is maintained, allowing each party of track what data it has submitted to the learning platforms, which models have been trained using its data, whether other parties have access to the model, and/or the like. This learning method uses swarm intelligence, also referred to as swarm learning, as the system learns based on the swarm of customer data points.

Figure 2:
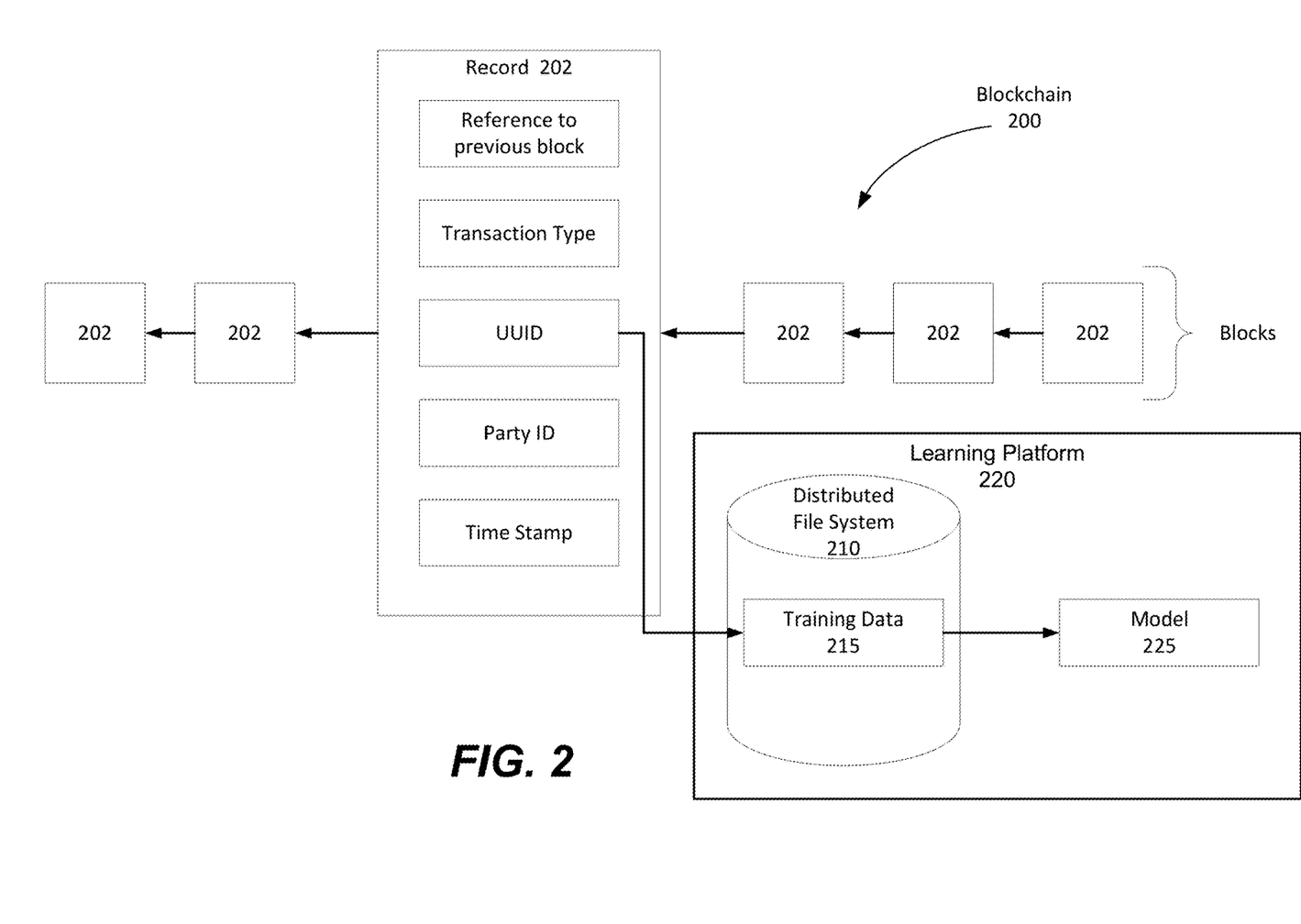
FIG. 2 illustrates a blockchain that can be used to monitor and track data submitted by various parties for model training, in accordance with some embodiments.

FIG. 2 illustrates a blockchain that can be used to monitor and track data submitted by various parties for model training, in accordance with some embodiments. A distributed file system 210 is configured to receive data suitable for training a model (e.g., clause examples) from each of a plurality of parties, which is stored as training data 215. The distributed file system 210 may be maintained by a learning platform 220, which comprises a transceiver (not shown) for receiving the training data 215, and accesses the received training data 215 (e.g., clause examples) on the distributed file system 210 in order to generate and train a model 225 (which is usable by the analysis engine 130 or semantic language evaluator 140 illustrated in FIG. 1 to identify various types of clauses in received data). In some embodiments, the distributed file system 210 may comprise an IPFS (interplanetary file system) or similar.

As discussed above, each party that submits data to form the set of training data 215 on the distributed file system 210 may need to be able to track their data, identify models trained using their submitted data, and request deletion of their data from the distributed file system 210. To do so, data stored onto the distributed file system 210 by various parties is monitored and tracked using the blockchain 200.

The blockchain 200 comprises a plurality of blocks, each corresponding to a record 202. Each record 202 corresponds to one or more actions performed on the data stored at the distributed file system 210. For example, a record 202 may correspond to a set of data added to the distributed file system 210 by a party, a request to delete data on the distributed file system 210 by a party, the training of a model 225 based on the distributed training data 215 stored on the distributed file system 210 received from a plurality of parties, and/or the like.

Each record 202 of the blockchain 200 comprises a reference (e.g., a pointer) to a previous record of the blockchain 200 and an indication of a transaction type corresponding to the record 202 (e.g., data added to the file system 210, request to delete data from the file system 210, etc.). The record 202 may further comprise a universal unique ID (UUID) corresponding to the set of data (hereafter also referred to as an "item") associated with the transaction. The UUID may be usable to track and identify different transactions (e.g., corresponding to different records) concerning the item recorded in the ledger system, such as the item being added to the distributed file system 210 to be used for model training, a request to remove the item from the distributed file system 210, etc. In some embodiments, the UUID corresponds to a hash generated from the item (e.g., using a SHA2 hashing algorithm). In some embodiments, the UUID serves as a pointer to the location of the item stored on the distributed file system 210. As such, the UUID of a record 202, when decrypted, can be used to retrieve the item associated with the record 202 on distributed file system 210.

Each record 202 further comprises a party ID corresponding to a party associated with the request (e.g., the party submitting the data to the distributed file system 210, the party requesting removal of the data from the distributed file system 210, etc.). In some embodiments, the party ID may correspond to a UUID or hash ID corresponding to the party. The record 202 may further comprise a time stamp indicating a time associated with the transaction or the creation of the record 202.

In some embodiments, the learning platform 220 maintains a private key usable to determine a public key. The public key can be used to encrypt data that can only be decrypted using the private key. The learning platform 220 provides a copy of the public key to each party contributing data for model training, which is usable by the respective parties to encrypt the data to be contributed (corresponding to the records 202). Because the contributed data has been encrypted using the public key of the learning platform 220, only the learning platform 220 (being the only entity having access to its private key) is able to decrypt the contributed data using its private key.

In some embodiments, each party further provides to the blockchain 200 its own public key, such that the blockchain 200 may hold the public keys of the parties that have contributed data to the learning platform 220. The learning platform 220 can access the public keys stored on the blockchain ledger and identify the parties from which data was received for training the model. As such, once the learning platform 220 has trained or updated the model, the learning platform 220 can issue the model to the specific parties that contributed data for model training, by encrypting the trained or updated model with each party's public key, so that only the parties that contributed data are able to decrypt and make use of the trained model. In some embodiments, the public keys maintained by the blockchain 200 are only accessible to the learning platform 220 for training the model, and not accessible to other parties that contribute data to model training (e.g., maintained in a private stream of the blockchain accessible to the learning platform but not to other parties). In some embodiments, the public key of a party may serve as the party's party ID indicated by each record 202 of the block 200, and is generally accessible to other parties. In some embodiments, each record may also contain additional metadata regarding the submitted item, such as a number of examples within the item, allowing for the parties to traverse the blockchain 200 to identify which other parties have submitted items for use in model training and how many data examples were submitted by each party.

In some embodiments, the learning platform 220 stores the public keys of each of contributing parties (e.g., within the distributed file system 210). In some embodiments, the party ID may be based upon a reference to the public key of the party, such as a hashed pointer to location of the public key stored on the learning platform 220. In some embodiments, the party ID of the record 202 may further include metadata corresponding to the party. As such, by traversing the blockchain 200, it can be determined which parties submitted which items to the distributed file system 210. For example, by identifying all records in the blockchain 200 associated with a particular party, the learning platform 220 can identify the items submitted by that party to the distributed file system 210, using the UUIDs of the identified records pointing to the submitted items on the distributed file system 210.

In some embodiments, the learning platform identifies the public key for each party based upon the party ID associated with each record 202 of the blockchain 200. In some embodiments, the party ID may be based upon a reference to the public key of the party, such as a hashed pointer to location of the public key stored on the learning platform 220 (e.g., within the distributed file system 210). In some embodiments, the party ID of the record 202 may further include metadata corresponding to the party. As such, by traversing the blockchain 200, the learning platform 220 can, using the party IDs of each record 202, determine which parties submitted which items to the distributed file system 210, and is able to access the public key of the parties in order to decrypt data submitted by the parties. For example, by identifying all records in the blockchain 200 associated with a particular party, the items submitted by that party to the distributed file system 210 can be identified using the UUIDs of the identified records pointing to the submitted items on the distributed file system 210.

In other embodiments, instead of each party encrypting data to be submitted using the public key of the learning platform 220, each party may encrypt the data using its own key, and provide to the learning platform 220 a key usable to decrypt the encrypted data submitted by the party. For example, each party may provide its key to the learning platform 220 through a private stream that can only be read by the learning platform 220. In other embodiments, each party, when submitting items to the learning platform 220, provides a party ID as part of the record 202 on the blockchain 200 that serves as a pointer to a location on the distributed file system 210 at which the party's key is stored. As the learning platform 220 traverses the blockchain 200 to determine the data to be used in training, the learning platform is able to, based upon the party ID associated with each record, identify the appropriate key to use in decrypting the data associated with the record.

In some embodiments, a different blockchain 200 is created for different types of training data (e.g., a different blockchain 200 for each information or clause type), for example clauses that are "Indemnity" clauses, which is visible to all parties within the SWARM. Each party can then assign to the blockchain information from within its domain that relates to Indemnity, allowing the learning platform 220 to generate and train a distributed model for identifying and categorizing indemnity clauses based upon data submitted by a plurality of parties.

In some embodiments, different types of training data may be tracked using different streams of data within a single blockchain 200. For example, while FIG. 2 illustrates the blockchain 200 as comprising a single stream of blocks, in other embodiments, the blockchain 200 may contain multiple streams, each stream corresponding to a different logical linking of blocks. In some embodiments, a stream may allow for cross blockchain access, in that the same stream may be configured to span over two different blockchain providers, allowing access to common data. In some embodiments, a master blockchain is implemented having links to one or more other blockchains.

When an item is stored on the distributed file system, its UUID and descriptive information (such as the source system and party identification) are encoded onto the blockchain. The blockchain provides a logical view of items sharing common information, for example all items marked and or set as Indemnity clauses. Each record within the blockchain is only able to be decoded by the learning platform, since only the learning platform will have access to its private key. However all parties to the blockchain are able to access a timeline of information indicating items added to the learning platform and by what party, based on the party ID included in each record. This allows all parties to track which other parties have access to any model created from the submitted data, it also allows each system to see the number of members within the SWARM for learning, as this is an indication of the potential accuracy of the generated models.

For example, a stream on the blockchain may maintain a record of UUIDs or hash IDs corresponding to each party. The stream may store a counter that indicates how many different parties (e.g., indicated by different keys or party IDs associated with the records of the stream) are currently within the stream. In some embodiments, this may be done using a smart contract type code, so that when an additional party contributes data to the stream, the count is incremented. In some embodiments, each of the parties is unable to determine the identities of other parties that have contributed data to the stream, but are able to determine the number of different parties and an indication of an amount of data contributed by each party. In addition, each party indicated as having contributed data on the stream may be automatically given access to the model trained using the distributed data provided by the plurality of parties.

In some embodiments, instead of each party submitting data (e.g., clause examples) to the distributed file system 210 for training the model 225, each party may submit a model trained on their own data. The distributed file system 210 stores the submitted models, which are recorded using the blockchain 200. For example, the UUID of each record 202 of the blockchain 200 may correspond to a pointer of a stored model on the distributed file system 210. The learning platform 220 uses the plurality of trained models to generate and train an ensemble model, allowing for each party contribute to the training of the ensemble model without directly exposing their data.

Refinement of Model Using GAN Learning

Once the learning platform has generated and trained a model based upon training data submitted by each of the plurality of parties, the model may be further refined and trained using a GAN. The use of a GAN, in effect, allows for a party to compete with the learning platform within a localized competition. While the party attempts to automatically generate as many data examples as possible that will be misclassified by the model trained by the learning platform (e.g., false positives), i.e. to fool a target system, the learning platform will continue to train and refine the model in order to more accurately classify received data examples.

In some embodiments, each party maintains a model (hereinafter referred to as the "generator model") built based on its own data (e.g., clause examples) that takes the data owned by the party and attempts to generate new examples that will be incorrectly classified by a competing model (e.g., the model generated and trained by the learning platform, hereinafter also referred to as the "classification model") configured to recognize a first type of clause (e.g., indemnity clauses). For example, the generator model for a party may receive data comprising examples of the first type of clause and generate new examples based on the received examples. The received examples may be referred to as "true" examples or "true" data examples since they are actual examples of the first type of clause. The generated new examples may comprise "true" examples (e.g., clauses that are also indemnity clauses) or "false" examples (e.g., clauses that, while similar to indemnity clauses, are not actually indemnity clauses). In some embodiments, one or more of the generated examples may correspond to "gradient" examples, and are associated with a score indicating a level to which the example is of the first type of clause. In some embodiments, the generator model attempt to generate new examples that will be misclassified by the classification model maintained at the learning platform. For example, the generator model may be configured to generate true examples deemed likely to be classified by the classification model as false, or false examples likely to be classified by the classification model as true. By refining the classification model based upon generated examples, the classification model can be trained based upon a more diverse set of data. In addition, the generator model may be further trained to be able to generate more diverse examples in an attempt to "trick" the classification model. The core idea behind GAN is the ability for a distributed set of systems corresponding to different parties to auto-learn information to drive a learning algorithm, with a reward for learning based on the classifications being in one of 2 states, true or false.

Figure 3:
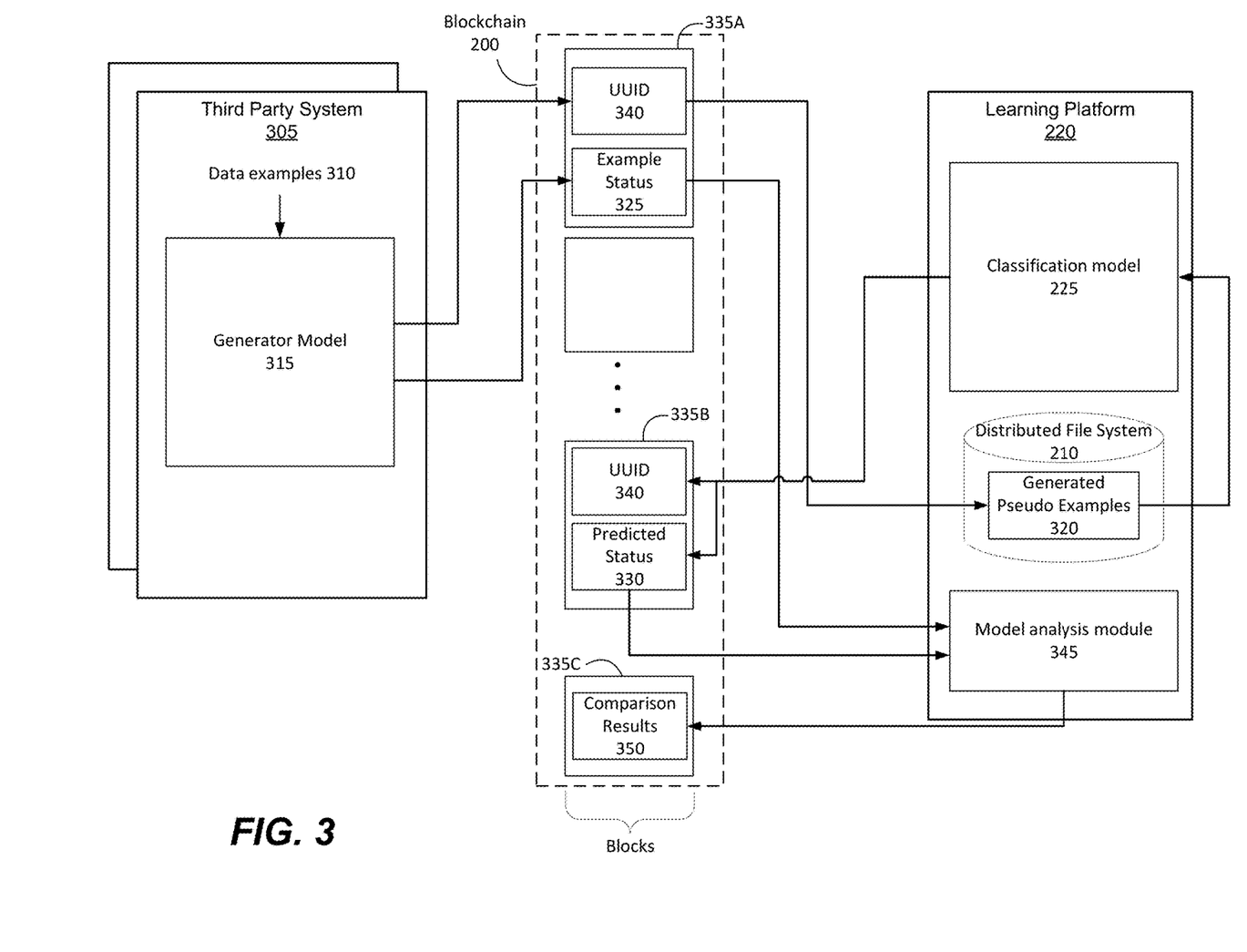
FIG. 3 illustrates a GAN learning system, in accordance with some embodiments.

FIG. 3 illustrates an example GAN learning system, in accordance with some embodiments. As illustrated in FIG. 3, the GAN learning system includes a third party system 305 and a learning platform 220, each in communication with a blockchain 200. For example, each of the third party system 305 and the learning platform 220 may comprise a transceiver module (not shown) able to record data onto the blockchain 200 (e.g., as one or more blocks), as well as read data from blocks on the blockchain 200. This enables the third party system 305 and the learning platform 220 to track transmitted data and how the data is used (e.g., submission of generated data examples to the learning platform, results of classification by the classification model, etc.) using the blockchain 200.

In the example GAN learning system illustrated in FIG. 3, the third party system 305 manages a generator model 315 that competes with the classification model 225 managed by the learning platform 220. The third party system 305 corresponds to a system associated with at least one party of the plurality of parties that submits data to the distributed file system 210 to form a party of the training data 215 for training the model 225 (e.g., as illustrated in FIG. 2). The third party system 305 submits data to the distributed file system using the blockchain 200, as discussed above.

The third party system 305 maintains data comprising data examples 310 (e.g., clauses examples corresponding to a particular type of clause). The data examples 310 correspond to data obtained by the third party system 310 that corresponds to a particular clause type (e.g., indemnity clause). In some embodiments, the third party system 305 submits at least a portion of the data examples 310 to the learning platform 220 to be used as training data for generating and training the classification model 225. Submission of the data examples 310 and training of the model 225 using the clause examples may be tracked using the blockchain 200 as discussed above.

The third party system 305 further maintains a generator model 315. The generator model 315 is created based on the third party's own local data (e.g., data examples 310), and, in response to receiving at least a portion of the data examples 310, automatically generates additional examples 320 (e.g., pseudo data examples) based upon the received clauses examples 310. As discussed above, the generated pseudo examples 320 may comprise true examples and false examples. As each generated pseudo example will have been auto generated by the generator model 315, sensitive information present in the original data examples 310 can be removed and noise inserted, such that the generated pseudo examples 320 will not contain any sensitive or confidential information. The generator model 315 further generates status information 325 that indicates, for each of the generated pseudo examples 320, whether the example is a true example or a false example.

The third party system 305 encodes and submits the generated pseudo examples 320 and example status information 325 to the learning platform 220 (e.g., stored on the distributed file system 210) to be evaluated by the classification model 225 trained by the learning platform. In some embodiments, the generated examples 320 and the example status information 325 may be encoded together (e.g., using the public key of the learning platform, thus allowing for decryption by the learning platform using its private key).

The submission of the generated examples 320 and example status information 325 to the learning platform 220 is tracked using the blockchain 200. For example, the third party system 305 may create a new block 335A on the blockchain 200 corresponding to the submission of the generated pseudo examples 320 and example status information 325 by sending to the blockchain 200 a UUID (e.g., a SHA2 hash) of the encrypted generated pseudo examples 320. The UUID may function as a pointer to the encrypted generated pseudo examples 320 that are written to the distributed file system 210 of the learning platform 320. As such, the learning platform 220 can retrieve the generated examples 320 to be processed by the trained classification model 225 using the UUID 340 of the block 335A.

In some embodiments, the example status data 325 may be stored on the distributed file system 210 along with the generated pseudo examples 320, and be indicated by the UUID 340. In other embodiments, because the example status data 325 may be small in size (e.g., in some cases only needing 1 bit for each of the generated pseudo examples 320), the example status data 325 may be stored as part of the block 335A in the blockchain 200. In some embodiments, the example status data 325 may be stored in the form of a plurality of tuples, each tuple indicating an identifier of a pseudo-example (e.g., a UUID), an indication of whether the pseudo-example is a true or false example, and, optionally, an indication of a type of classification (e.g., a type of clause, such as assignment, indemnity, etc.). The block 335A further contains a timestamp indicating a time at which the generated examples 320 were submitted to the learning platform 220.

The learning platform 220 accesses the block 335A of the blockchain 200, uses the UUID 340 of the block 335A to identify the stored and encrypted generated pseudo examples 320 on the distributed file system 210, and decodes the generated pseudo examples 320 (e.g., using its private key). Once decoded, the learning platform 220 is able to process the generated pseudo examples 320 using the classification model 225. The classification model 225 is configured to receive the generated examples 320, and for each example, generate status information indicating whether the example is true (e.g., an example of the required class) or false (e.g., not a valid example). In some embodiments, the generated status information may comprise a score indicating a level to which the classification model 225 determines the example to be of the particular type. In some embodiments, the score may correspond to a confidence value as to whether the example is true or false. The generated status information output by the classification model 225 is stored as predicted status information 330.

The predicted status information 330 is written to the blockchain 200 by the learning platform 220, using a new block 335B on the blockchain 200. The block 335B stores the UUID 340 corresponding to the generated pseudo examples 320 and an indication of the predicted status information 330. In some embodiments, the predicted status information 330 is stored on the distributed file system 210, and a hash or UUID corresponding to the predicted status information 330 stored as part of the block 335B. In other embodiments, the predicted status information 330 is stored on the block 335B, similar to how the example status information 325 may be stored in the block 335A. The block 335B further contains a timestamp corresponding to a time at which the classification model 225 finished classifying the generated examples 320.

In some embodiments, a predetermined cycle time (e.g., 10 minutes) is used for the learning platform 220 to accept the generated pseudo examples 320 submitted by the third party system 305, perform classification using the model 225, and write the predicted status information 330 to the blockchain 200. At the completion of the cycle, the model analysis module 345 of the learning platform 220 runs a code snip, at times referred to as a "smart contract", to assess the performance of the classification model 225 (e.g., by analyzing the predicted status information 330 relative the submitted example status information 325).

The model analysis module 345 runs the code snip (or code) to review all the classifications and select the data examples that were classified incorrectly by the model 225, and to update the blockchain ledger with the results. For example, the learning platform 220 may scan the blocks of the blockchain 200 and identify the blocks 335A and 335B as a pair, based upon the common UUID 340 pointing to the same generated pseudo examples 320. In some embodiments, the pairing of the blocks 335A and 335B is further based upon the time stamps of each block (e.g., the timestamp for the block 335B must be after that for the block 335A).

Based upon the blocks 335A and 335B, the model analysis module 345 retrieves the example status information 325 and the predicted status information 330, and compares them to determine if the predicted status information 330 matches the example status information 325 for each of the generated pseudo examples 320. If the model 225 correctly classified a generated example, then the predicted status will match the example status. On the other hand, if the model 225 classified the generated example incorrectly, then the predicted status and the example status will be different. In embodiments where the example status information 325 for the generated pseudo examples and/or the predicted status information 330 generated by the model 225 comprise scores instead of binary true or false values, the score generated by the model 225 may be considered correct if it is within a threshold value of the actual score corresponding to the generated example. As such, the accuracy of the model 225 in classifying the generated pseudo examples can be determined. The comparison results 350 may be written to the blockchain 200 as block 335C, accompanied by a timestamp. In some embodiments, the comparison results 350 may be reviewed by an expert or human user to verify the accuracy of the results. In some embodiments, the comparison results 350 may be stored as one or more tuples, each tuple indicating a pseudo-example (e.g., a UUID) and a comparison result for the pseudo-example (e.g., true or false). The tuple may further comprise an indication of a type of classification performed, an indication of the previous blocks containing the example status 325 and the predicted status 330, and/or the like. In some embodiments, the block 335C further contains a UUID corresponding to the UUID 340 pointing to the stored pseudo-examples 320.

While the above discussion refers to the predicted status 330 and comparison results 350 as being binary (e.g., correct or incorrect), in other embodiments, the classification model 225 may produce predicted status information 330 that is in the form of percentages or other type of data (e.g., indicating a level at which a generated example matches a classification, a confidence value, etc.). In addition, the comparison results 350 in some embodiments may also be in the form of percentage values or other types of data.

Once the comparison results 350 have been written to the blockchain 200 (and verified), the learning platform 220 performs a learning loop on the model 225, where the information gained by comparisons are used to update the model 225 or to generate a new model for use. Once the update of the model is completed, the cycle starts again for learning.

As the learning platform 220 is able to accept information from any number of third party systems to perform classification on, it becomes a SWARM learning system that rewards and encourages each of the third party systems to try and beat the model (e.g., by submitting generating examples that the model 225 classifies incorrectly). This enables the model to be trained on a large number of very different data points from many different verticals and parties. However, because each party is in control of the data it generates, the generated information will not contain any customer specific or confidential information. Once generated, the learning platform may keep all information and use it to further learn from and review. In some examples, an expert may review the audit trail of the learning and prediction curve to ensure the system does not become unstable or unusable.

In some embodiments, one or more of the parties may be able to view the predicted status 330 information generated by the classification model 225 and/or the comparison results 350. For example, the predicted status 330 or the comparison results 350 may be encoded by the learning platform 220 using a public key of the respective third party, such that the third party (but not other parties) is able to view the results generated by classification model 225 when evaluating the pseudo examples submitted by the party, and whether the classification model 225 was able to correctly classify the pseudo examples. In some embodiments, the predicted status 330 and/or the comparison results 350 are encrypted by the learning platform 220, using the public keys of multiple other parties (e.g., other parties that also submitted pseudo examples to the learning platform), such that other parties may also be able to view the prediction results of the classification model 225 and whether they were correct. Because the predicted status 330 and the comparison results 350 do not need to contain the actual content of the pseudo examples, such information can be made accessible to other parties to allow them to assess the model for performance and potential bias, without exposing the actual data submitted by the party to other parties.

1-To-1 Parallel Configuration

In some embodiments, such as that discussed above, a plurality of different third parties may submit data (e.g., generated pseudo examples) to be processed by a single classification model on the learning platform (e.g., a many-to-1 configuration), allowing for the classification model to be trained on a larger variety of data examples associated with different parties.

However, in other embodiments, the learning platform may train and maintain a plurality of different classification models for a particular type of classification (e.g., classifying a particular type of clauses, such as indemnity clauses) that are each mapped to different generator models maintained by third parties. In some embodiments, the number of classification models and generator models may be mapped in a 1-to-1 configuration. As such, the pseudo examples generated by a particular generator model at a given time may be processed by only one classification model.

The learning platform may, at particular cycle time intervals (e.g., 10 minutes), change the mapping between generator models and classification models, such that each classification model processes generated pseudo examples from different generator models over a plurality of time intervals. This allows for each classification model to learn from a more distributed data set and avoid becoming overfitted to the generator model of a particular third party.

The learning platform, when changing the mappings between generator and classification models, records on the blockchain a record indicating the current mappings. Thus, by stepping through the blocks of the blockchain, a record of which generator models were used to provide pseudo examples for training a particular classification model can be determined. This allows for users of the learning platform and/or the third parties to review or audit the classification models and see how they were trained (e.g., review which other parties contributed to the training of the model and/or a quantity of data contributed by each party).

In some embodiments, the plurality of classification models may each be trained in different ways, and as such may have different levels of performance. The learning platform may select at least one of the plurality of classification models for use as a final trained model, based upon which classification model is able to achieve the highest performance. In some embodiments, the performance of the classification models may be assessed based upon how accurately the models were able to predict the classification of the pseudo examples generated by a plurality of the generator models. In other embodiments, a separate set of examples may be used to assess the performance of the classification models.

In some embodiments, the use of multiple classification models processing pseudo examples generated by different generator models in parallel, and periodically changing the mappings between the classification models and generator models to allow the classification models to be trained on a more diverse data set may be referred to as Generative Adversarial Parallelization, or GAP.

Rewards System

In some embodiments, in order to encourage parties to provide data examples generated using competing generator models for evaluating the classification model trained by the learning platform, a reward may be given to a party for data examples provided by the party that the model classifies incorrectly. The reward may correspond to any type of incentive that may be distributed to the party, such as points, monetary incentives, virtual currency, and/or the like. For example, in some embodiments, rewards may be distributed to parties in the form of a cryptocurrency. The learning platform may transmit a notification to a user of each party, notifying the party of the potential reward that may be given for the submission of data examples. The distributed rewards may be recorded onto the same blockchain (e.g., the blockchain 200), using one or more blocks detailing the party to which the reward is distributed to, the reward amount, and the data example corresponding to the distributed reward (e.g., the data example submitted by the generator model of the party and classified incorrectly by the classification model). By recording the distribution of rewards on the blockchain, the parties are able verify the amount of rewards that have been distributed, providing additional transparency. In some embodiments, the learning platform, when recording on the blockchain records indicating the distribution of rewards to one or more parties, may encode the indication using keys associated with each of the parties that submitted data examples, allowing for each of the parties to view how rewards were distributed to each of the parties.

In some embodiments, the reward given to a party may be based upon an aggregation of correct and incorrect classifications performed by the classification model based upon the pseudo examples submitted by the party. For example, for every incorrect classification performed by the model on a submitted pseudo example, the model is penalized by a set amount (e.g., corresponding to a fee in the form of a digital token or fraction thereof). On the other hand, for each correct classification the model performs, the model gains a token or a part thereof. The final reward paid to the party may correspond to the net amount to digital tokens the model is penalized for after classifying the pseudo examples received from the party.

In some embodiments, the gains and penalties are weighted such that incorrect classifications are weighed more heavily than correct classifications. For example, the ratio may be 1 to 5, where by the model is penalized by a factor of 5 for incorrect classifications in comparison to correct classifications, thus it will always pay more tokens when it incorrectly predicts an outcome. In some embodiments, the net amount of tokens gained or penalized are determined for each party per cycle, and the appropriate fee paid to the parties. In some embodiments, parties are paid a fee when the net amount of tokens for the model is a net penalty, but do not pay a fee when the net amount of tokens for the model is a net gain.

As such, during each time window, the learning platform would re-evaluate the performance of the model and learn from its mistakes. The parties would benefit two fold, in that they would gain access to the new and improved model that has been taught on many different and distributed data elements and verticals, as well as having financial rewards for providing the data examples used to train and refine the model.

Process Flow

Figure 4:
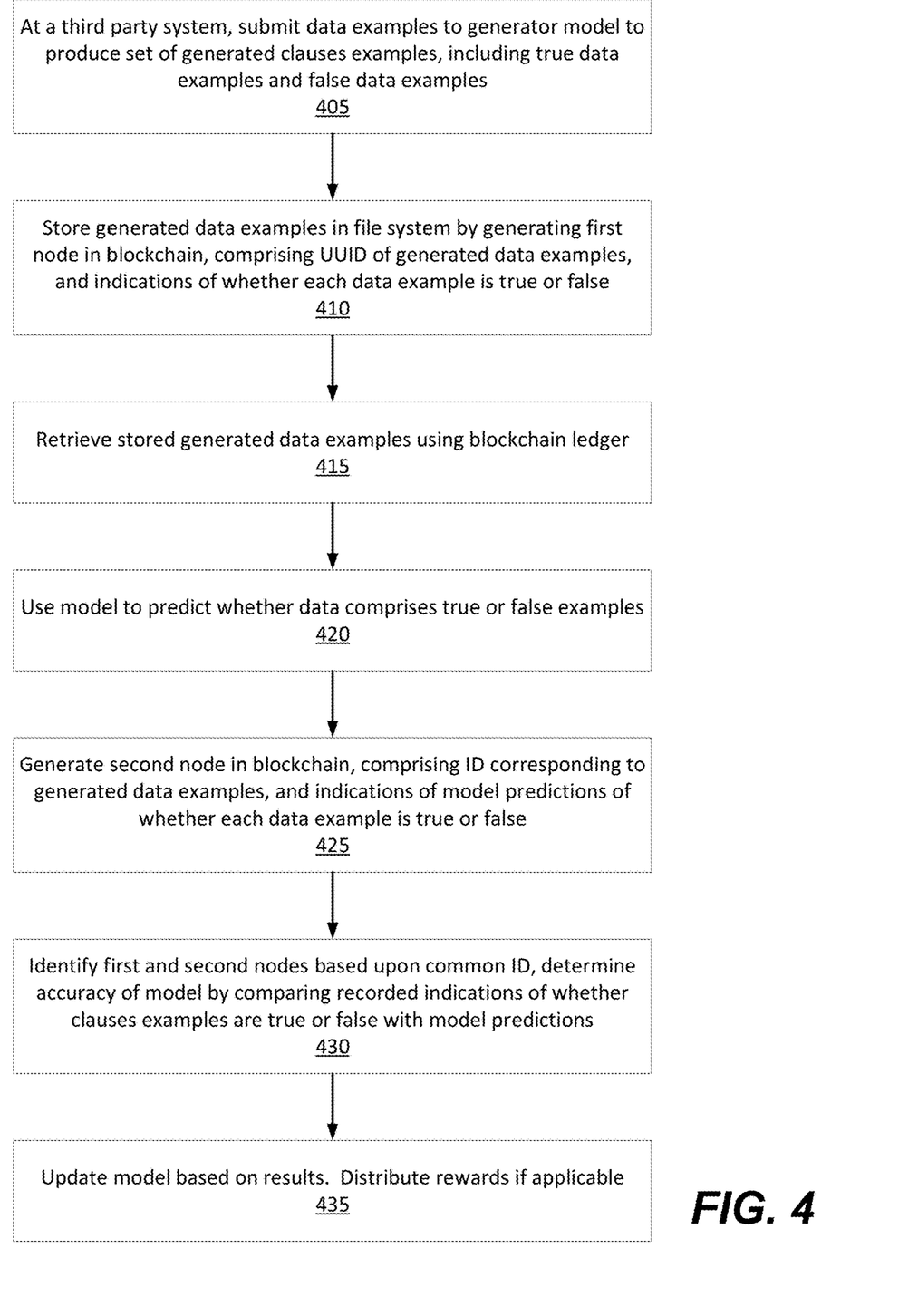
FIG. 4 is a flowchart of a process for training a model using a GAN, in accordance with some embodiments.

FIG. 4 is a flowchart of an example process for training a model using GAN learning, in accordance with some embodiments. At block 405, each of a plurality of parties (e.g., two or more third party systems) uses a generator model to generate data examples. A generator model corresponds to a model created based upon data examples (e.g., example clauses of a particular type) provided by the third party system, and is configured to generate additional data examples (e.g., pseudo data examples), each of which may correspond to a true example or a false example.

At block 410, the third party system submits the generated data examples to the learning platform (e.g., to be stored on a distributed file system) by generating a first block on a blockchain ledger. The first block comprises a timestamp of the submission, and a UUID or hash pointing to the generated data examples stored on the distributed file system. In addition, the first block may indicate status information corresponding to the generated example data indicating whether each data example is a true example or a false example. The status information may be stored on the distributed file system and indicated by the UUID, or may be stored directly on the block. The generated data examples and/or the status information may have been encrypted by the submitting third-party system, using a public key of the learning platform provided to the party.

At block 415, the learning platform retrieves the stored data example based upon the first block. For example, using the first block of the blockchain ledger, the learning platform identifies the location generated data examples stored on the distributed file system (e.g., using the UUID), and decrypts the stored generated data examples (e.g., using its private key).

At block 420, the learning platform uses a classification model to process the generated data examples, and generate a determination as to whether each of the generated data examples is a true example or a false example. At block 425, the learning platform generates a second block on the blockchain. The second block comprises a UUID corresponding to the generated data examples that were processed by the classification model, and an indication of the predicted status information determined by the classification model (e.g., stored on the distributed file system and indicated by the second block using a UUID or hash, or stored directly on the second block).

At block 430, the learning platform identifies the first and second blocks of the blockchain ledger based upon the common generated data examples indicated by the UUIDs of each block. Using the first and second blocks, the learning platform is able to retrieve the expected status information (indicating whether each data example is true or false) and the predicted status information (indicating how the classification model classified each data example), and compares them against each other to determine whether the classification model classified each of the data examples correctly.

At block 435, the learning platform updates the classification model based upon the results of the comparison. In addition, in some optional embodiments, the learning platform may initiate the distribution of rewards to the third party system, based upon whether the third party system submitted any data examples that were incorrectly classified by the model.

In some embodiments, submission of data examples by the third party system and classification of received data examples by the classification model may occur independently. Evaluation of the classification performed by the classification model may be done regular intervals, e.g., based upon a predetermined cycle time (e.g., 10 minutes). For example, at the end of each cycle, the learning platform 220 may run a code snip (e.g., a smart contract) that traverses the blockchain and identify the first block corresponding to the submission of the data examples (indicating the expected classification results) and the second block corresponding to the actual classification results generated by the model, and compares the results to evaluate performance of the classification model and distribute rewards if applicable.

Using the above process, the third party system "competes" with the classification model by submitting generated data examples to attempt to cause the classification model to perform an incorrect classification. The classification model classifies the submitted data examples and can be trained and updated based upon the results, potentially improving performance of the model.

The competition above can be played out via many different systems, in a many to one method. With only one system (e.g., the learning platform 220) being able to generate the classification model, but many systems (e.g., third party systems) able to generate the auto generation models for generating and submitting example data for classification. In other embodiments, such as in the GAP configuration described above, the learning platform may maintain multiple classification models each mapped to a different generator model in a one-to-one configuration, and switches the mapping between the classification and generator models over different cycles to allow the classification models to be trained on a more diverse data set.

With the above in place, a new secure method of learning is available, that vastly increases the learning time, accounts for large amounts of information from differing sources and allows customers to generate fake, but still highly relevant information. By providing the ability to auto generate false positives and true positives from existing information, customer specific and confidential data can be removed.

The optional payment to parties for the process also may be verified via an audit process that would occur over time, and thus payments would be delayed and held for a set period to deter users sending an incorrect classifications to the system in the initial placement call (e.g., incorrect example statuses corresponding to submitted pseudo-examples).

By providing the above, a new system is available to become a distributed and automated fast and secure learning system.

Preprocessing of Data Examples

In some embodiments, before a party submits an item of data (e.g., data examples, including real or pseudo-examples) to be stored in the distributed file system for model generation and training, the data may be preprocessed in order to remove any client-sensitive information that may be contained within the data. In some embodiments, any sensitive information would be replaced with NLP (natural language processing) placeholders. For example, each item may be parsed to recognize sensitive information, such as N-GRAMS (e.g., a sequence of words collectively corresponding to sensitive information), monetary values and other financial information, PPI, party/company/people's names, percentages, durations of time and numbers, etc. An NLP process may be designed to detect and then replace sensitive information in each item with an NLP placeholder, such as WTPerson, WTNumber, etc., in order to hide any confidential information and is a key component of an information discovery platform. This process ensures that such information is hidden and replaced with placeholders common to all parties using the system. One example of this would be replacing the party name Seal Software Inc., with WTOrganisation, or replacing 22/08/1987 with WTDate.

In some embodiments, because N-GRAM replacements may differ significantly between customers, a method of a pseudo-random code based on the time stamp of the last record created in the blockchain may be used. This allows all parties to be in sync and use a consistent method to replace the N-GRAMs. Based on the time stamp of the record, a randomized set of values can be used to replace the actual text of the item. As the records of the blockchain are persistent and will not change over time, the value of time stamp will always be known. In some embodiments, for a given time, the same words will be replaced with the same N-GRAMS across all parties.

In some embodiments, the learning platform maintains a known set of mappings that map N-GRAMS to replacement words that changes over time (e.g., periodically). As such, when an N-GRAM is detected, the N-GRAM is replaced based upon the current set of mappings. An N-GRAM may correspond a known pattern of words. For example, "xxx yyy LTD" and "aaa bbb INC" may correspond to two different tri-grams, where "xxx", "yyy", "aaa", and "bbb" correspond to variable words. The learning platform may detect a particular type of N-GRAM (e.g., "xxx yyy LTD") and replace the words of the detected N-GRAM with replacement words based upon the current mappings. As such, all N-GRAMs of a certain type may be replaced with the same replacement words at a given time (e.g., the tri-gram "xxx yyy LTD" is replaced with the same words at a given time regardless of party submitting the information or the original words for "xxx" and "yyy"). As such, the learning platform, when generating and training a model, does not have knowledge of the actual original words of the N-GRAM, only that the data item contains an N-GRAM of a particular type. Therefore, it would be impossible for a third party, even if they were able to access the data received at the learning platform that is submitted by the party, to determine the original words of the N-GRAM, since all N-GRAMs of the same format will be replaced in the same way at a given time.

In some embodiments, the set of mappings is stored on a private stream of the blockchain that can only be accessed by the learning platform via its keys (e.g., encrypted using the public key of the learning platform). Each of the submitting parties may be able to access only a point in time of the set of mappings, in order to map identified N-GRAMs to replacement words. In some embodiments, the stream maintains the set of mappings that is randomized for use based upon a given time stamp. The resulting set of mappings is encrypted by the learning platform using the public keys of the submitting parties, and is written to a stream that can be read by each party and decrypted for use (e.g., using their respective private keys). In other embodiments, instead of a set of mappings, the learning platform may generate and maintain an algorithm configured to generate mappings based upon a current time stamp.

In some embodiments, obfuscation of N-GRAMs may be performed for real examples submitted by each party used for model training, but is not performed for pseudo-examples submitted for model evaluation, as the pseudo-examples generated by the party's generator model may already be scrubbed of sensitive information. In other embodiments, obfuscation may be performed for both real and pseudo-examples. In some embodiments, a user associated with a third party system may manually mark up examples to be submitted to the learning platform (e.g., by swapping out sensitive information within an example with generic information).

Examples of obfuscating sensitive information in submitted data items are described in greater detail in U.S. patent application Ser. No. 16/244,037, titled "Managing Information for Model Training Using Distributed Blockchain Ledger" and filed on even date herewith, which is hereby incorporated by reference in its entirety.

Computing Machine Architecture

Figure 5:
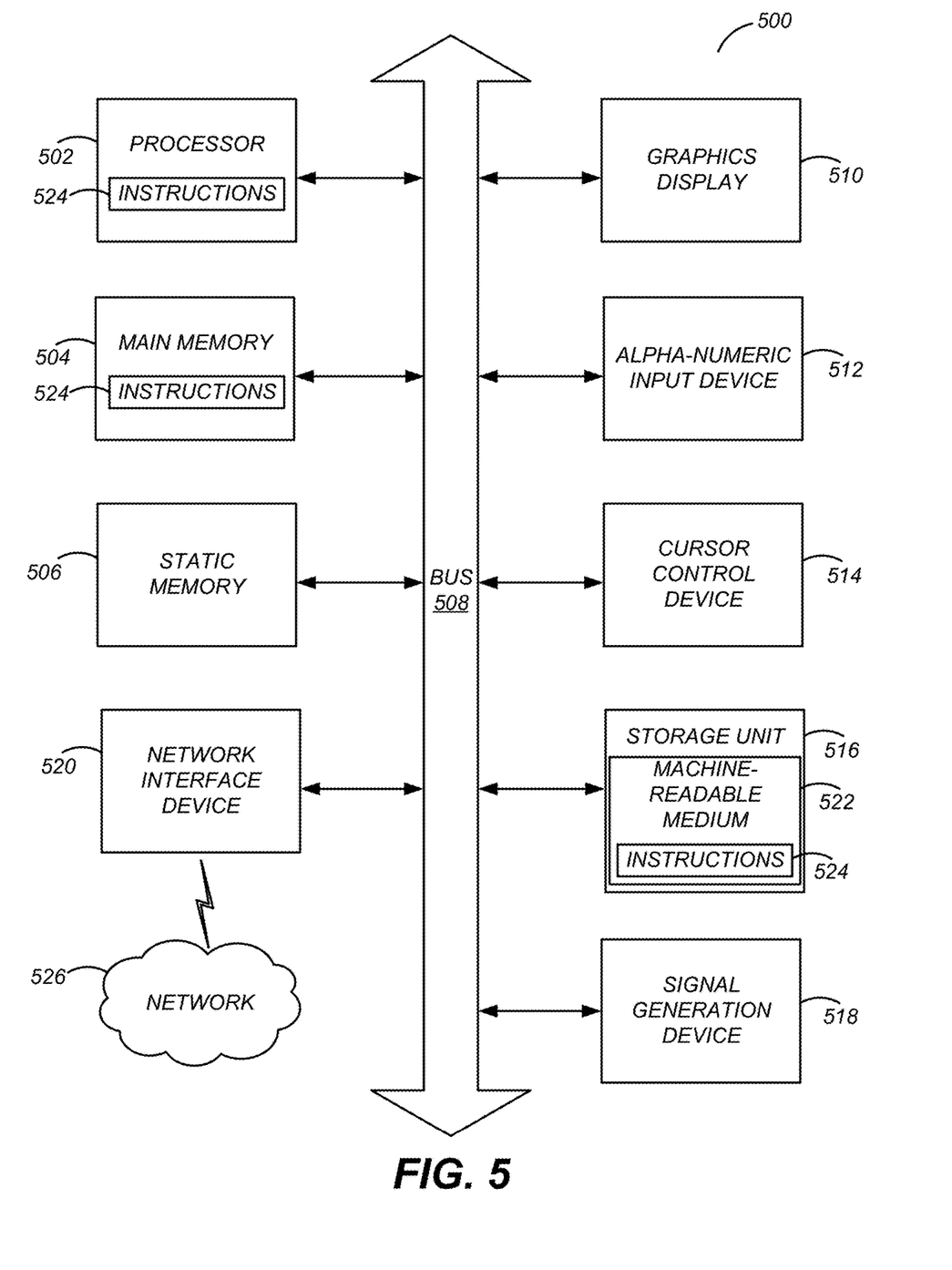
FIG. 5 illustrates components of an example machine able to read instructions from a machine-readable medium and execute them in a processor (or controller).

Turning now to FIG. 5, it is a block diagram illustrating components of an example machine able to read instructions from a non-transitory machine-readable medium and execute them in a processor (or controller). Specifically, FIG. 5 shows a diagrammatic representation of a machine in the example form of a computer system 500 within which instructions 524 (e.g., software or program code) for causing the machine to perform (execute) any one or more of the methodologies described with FIGS. 1-4. That is, the methodologies illustrated and described through FIGS. 1-4 can be embodied as instructions 524 that are stored and executable by the computer system 500. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The processing components are the processor 502 and memory 504. These components can be configured to operate the engines or modules with the instructions that correspond with the functionality of the respective engines or modules. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The storage unit 516 may be implemented as volatile memory (static RAM (SRAM) or dynamic RAM (DRAM)) and/or non-volatile memory (read-only memory (ROM), flash memory, magnetic computer storage devices (e.g., hard disks, floppy discs and magnetic tape), optical discs and etc.). The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of training and updating models for clause identification, the principles disclosed can apply to the training and updating of other types of models using data from a plurality of different parties. Advantages of the disclosed configurations the ability of each party to automatically generate data examples for training the model, allowing the model to be able to be trained using a more diverse set of information. By automatically generating data examples using a generator model, each party is able to ensure that the generated data examples reflect the existing data examples owned by the party, while free of any sensitive or confidential information. By processing the generated data examples submitted by each of the parties using the model, the performance of the model can be evaluated, and rewards distributed to the parties based upon whether or not they were able to submit data examples that were incorrectly classified by the model, and thus useful for further training the model. This incentivizes the parties to submit additional generated data examples, allowing for the model to be further developed and trained. Moreover, while the examples herein are in the context of clause identification for a contract document, the principles described herein can apply to other documents, for example web pages, having various clauses, or other types of data able to be classified using a classification model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, engines, modules, or mechanisms, for example, as illustrated in FIGS. 1-5. Modules may constitute either software modules (e.g., program code embodied as instructions 524 stored on a machine-readable medium e.g., memory 504 and/or storage unit 516, and executable by one or more processors (e.g., processor 502)) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors (generally, e.g., processor 502)) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting standard exact clauses and non-standard clauses through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for evaluating a machine-trained model trained based on a distributed set of data from a plurality of third party systems, comprising:
    receiving, from a third party system of the plurality of third party systems, a set of generated data examples produced by a generator model in response to submitting one or more data examples of a first type to the generator model, wherein each of the generated data examples is associated with an indication of whether the data example is a true data example of the first type or a false data example of the first type;
    storing the set of generated data examples on a file system;
    generating one or more first nodes on a distributed ledger comprised of at least:
        an identifier corresponding to the set of generated data examples stored on the file system, and
        for each data example of the set of generated data examples, the indication of whether the data example is a true data example or a false data example;
    retrieving the set of generated data examples from the file system using the distributed ledger;
    evaluating the set of generated data examples using a machine-trained model configured to, for each data example of the set of generated data examples, generate a prediction of whether the data example is a true data example or a false data example;

generating one or more second nodes on the distributed ledger comprised of at least:
  an identifier corresponding to the set of generated data examples stored on the file system, and
  for each data example of the set of generated data examples, an indication of the prediction generated by the machine-trained model of whether the data example is a true data example or a false data example;

determining an accuracy of the machine-trained model by:
  identifying the one or more first nodes and one or more second nodes based upon a common identifier corresponding to the set of generated data examples; and
  perform a comparison of the indications of the one or more first nodes of whether the data example is a true data example or a false data example and the indications of the one or more second nodes corresponding to predictions generated by the machine-trained model; and
  determining a score for the machine-trained model based upon a weighted difference between a number of correct predictions generated by the machine-trained model and a number of incorrect predictions generated by the machine-trained model determined based upon the comparison; and updating the machine-trained model based upon results of the comparison.

2. The computer implemented method of claim 1, wherein the first type corresponds to a type of clause, and wherein the machine-trained model is configured to receive the set of generated data examples and determine if each data example is a true example of the first type or a false example of the first type.

3. The computer implemented method of claim 1, further comprising recording on the distributed ledger one or more third nodes indicating the results of the comparison.

4. The computer implemented method of claim 1, further comprising making a payment to the third party based upon the determined score.

5. The computer implemented method of claim 4, further comprising recording, on the distributed ledger, one or more third nodes indicating the payment made to the third party based upon the determined score.

6. The computer implemented method of claim 1, further comprising:
  receiving and storing respective sets of data examples from each of the plurality of third party systems on the file system;
  recording, on the distributed ledger, respective one or more first nodes corresponding to the respective sets of data examples;
  evaluating the respective sets of data examples using the machine-trained model;
  recording, on the distributed ledger, respective one or more second nodes corresponding to the predictions generated by the machine-trained model based upon the respective sets of data examples;
  pairing the respective one or more first nodes with the respective one or more second nodes based upon the identifiers of each set of records to respective sets of data examples.

7. The computer implemented method of claim 1, further comprising periodically changing which third party system of the plurality of third party systems is to provide sets of data examples to be evaluated by the machine-trained model, such that the machine-trained model evaluates sets of data examples received from a first third party system of the plurality of third party systems during a first period of time, and sets of data examples received from a second third party system of the plurality of third party systems during a second, subsequent period of time.

8. The computer implemented method of claim 7, further comprising recording, on the distributed ledger, a set of mappings indicating which third party system of the plurality of third party systems is mapped to the machined-trained model during a current period of time.

9. The computer implemented method of claim 1, wherein at least a portion of one or more data examples of the set of data examples is replaced with replacement information selected based upon an information type of the portion of the one or more data examples.

10. The computer implemented method of claim 9, wherein the replacement information is determined based upon a set of mappings and a time value of a previous record of the distributed ledger.

11. A system, comprising:
  a file system configured to store a set of generated data examples received from a third party system, wherein the set of generated data examples is produced by a generator model of the third party system in response to submitting one or more data examples of a first type to the generator model, wherein each of the generated data examples is associated with an indication of whether the data example is a true data example of the first type or a false data example of the first type;
  a machine-trained model configured to evaluate the set of generated data examples by generating, for each data example of the set of generated data examples, a prediction of whether the data example is a true data example or a false data example, the machine-trained model trained on a distributed set of data provided by a plurality of third party systems;
  a transceiver module in communication with a distributed ledger, and configured to:
    generate one or more first nodes on the distributed ledger comprised of at least an identifier corresponding to the set of generated data examples stored on the file system, and, for each data example of the set of generated data examples, the indication of whether the data example is a true data example or a false data example;
    generate one or more second nodes on the distributed ledger, comprised of at least an identifier corresponding to the set of generated data examples stored on the file system and, for each data example of the set of generated data examples, an indication of whether the data example is a true data example or a false data example as predicted by the machine-trained model; and
  a model analysis module configured to:
    identify the one or more first nodes and one or more second nodes based upon a common identifier corresponding to the set of generated data examples;
    perform a comparison of the indications of the one or more first nodes of whether the data example is a true data example or a false data example and the indications of the one or more second nodes corresponding to predictions generated by the machine-trained model, determine a score for the machine-trained model based upon a weighted difference between a number of correct predictions generated by the machine-trained model and a number of incorrect predictions generated by the machine-trained model determined based upon the comparison; and update the machine-trained model based upon results of the comparison.

12. The system of claim 11, wherein the first type corresponds to a type of clause, and wherein the machine-trained model is configured to receive the set of data examples and determine if each data example is a true example of the first type or a false example of the first type.

13. The system of claim 11, wherein the transceiver module is further configured to record on the distributed ledger one or more third nodes indicating the results of the comparison.

14. The system of claim 11, wherein the model analysis module is configured to initiate a payment to the third party based upon the determined score.

15. The system of claim 11, wherein the third party system of the plurality of third party systems that provides sets of data examples to the file system to be evaluated by the machine-trained model periodically changes, such that the machine-trained model evaluates sets of data examples received from a first third party system of the plurality of third party systems during a first period of time, and sets of data examples received from a second third party system of the plurality of third party systems during a second, subsequent period of time.

16. The system of claim 11, wherein at least a portion of one or more data examples of the set of data examples is replaced with replacement information selected based upon an information type of the portion of the one or more data examples.

17. The system of claim 16, wherein the replacement information is determined based upon a set of mappings and a time value of a previous record of the distributed ledger.

* * * * *